(12) United States Patent
Lee et al.

(10) Patent No.: US 8,974,901 B2
(45) Date of Patent: Mar. 10, 2015

(54) MULTILAYER THIN FILM FOR CERAMIC ELECTRONIC COMPONENT AND METHOD OF MANUFACTURING THE SAME

(75) Inventors: Kwang Jik Lee, Gyunggi-do (KR); Suk Jin Ham, Seoul (KR); Ji Hyuk Lim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 350 days.

(21) Appl. No.: 13/293,992

(22) Filed: Nov. 10, 2011

(65) Prior Publication Data

US 2012/0276372 A1 Nov. 1, 2012

(30) Foreign Application Priority Data

Apr. 26, 2011 (KR) ........................ 10-2011-0038787

(51) Int. Cl.
*B32B 3/00* (2006.01)
*H05K 3/10* (2006.01)
*B32B 15/04* (2006.01)
*B23B 3/00* (2006.01)

(52) U.S. Cl.
CPC ........................................ *B23B 3/00* (2013.01)
USPC ............ 428/336; 428/457; 428/701; 428/702

(58) Field of Classification Search
None
See application file for complete search history.

(56) References Cited

U.S. PATENT DOCUMENTS

| | | | |
|---|---|---|---|
| 5,412,865 A | 5/1995 | Takaoka et al. | |
| 6,205,014 B1 | 3/2001 | Inomata et al. | |
| 6,316,084 B1 * | 11/2001 | Claus et al. | 428/212 |
| 8,048,150 B2 * | 11/2011 | Weber et al. | 623/1.42 |
| 2002/0075632 A1 | 6/2002 | Nakano et al. | |
| 2007/0146887 A1 * | 6/2007 | Ikeda et al. | 359/586 |
| 2008/0032424 A1 | 2/2008 | Ahn et al. | |
| 2010/0226067 A1 | 9/2010 | Osada et al. | |

FOREIGN PATENT DOCUMENTS

| | | |
|---|---|---|
| JP | 562860 A | 4/1993 |
| JP | 5-166666 A | 7/1993 |
| JP | 11-317322 A | 11/1999 |
| JP | 2000-275157 A | 10/2000 |
| JP | 2000-294450 A | 10/2000 |
| JP | 2000294451 A | 10/2000 |
| JP | 2002-305124 A | 10/2002 |

(Continued)

OTHER PUBLICATIONS

Korean Office Action with English translation issued in Korean Application No. 10-2011-0038787 issued on Apr. 25, 2012.

(Continued)

*Primary Examiner* — Vera Katz
(74) *Attorney, Agent, or Firm* — McDermott Will & Emery LLP

(57) ABSTRACT

There are provided a multilayer thin film for a ceramic electronic component and a method of manufacturing the same. The multilayer thin film includes a substrate; and a ceramic layer and a metal layer alternately formed on at least one of upper and lower surfaces of the substrate, wherein at least one of the ceramic layer and the metal layer has a height corresponding to a thickness of at least one of a plurality of particles arranged on a plane. With the multilayer thin film for a ceramic electronic component, the number of layers increases and a distance between electrodes decreases, whereby capacitance may increase.

6 Claims, 4 Drawing Sheets

(56) References Cited

FOREIGN PATENT DOCUMENTS

| | | |
|---|---|---|
| JP | 2004-200190 A | 7/2004 |
| JP | 2005-254152 A | 9/2005 |
| JP | 2008246716 A | 10/2008 |
| JP | 2009-224145 A | 10/2009 |
| JP | 2009-238459 A | 10/2009 |
| JP | 2010-126735 A | 6/2010 |
| JP | 2010-217935 A | 9/2010 |
| KR | 10-2010-0011640 A | 2/2010 |
| WO | WO-2008/078652 A1 | 7/2008 |
| WO | 2010019272 A2 | 2/2010 |

OTHER PUBLICATIONS

Japanese Office Action issued in Japanese Patent Application No. 2011-243185 dated Nov. 27, 2012.

Japanese Office Action issued in Application No. 2011-243185 dated Apr. 16, 2013.

* cited by examiner

MULTILAYER THIN FILM FOR CERAMIC ELECTRONIC COMPONENT AND METHOD OF MANUFACTURING THE SAME

CROSS-REFERENCE TO RELATED APPLICATIONS

This application claims the priority of Korean Patent Application No. 10-2011-0038787 filed on Apr. 26, 2011, in the Korean Intellectual Property Office, the disclosure of which is incorporated herein by reference.

BACKGROUND OF THE INVENTION

1. Field of the Invention

The present invention relates to a multilayer thin film for a ceramic electronic component in which capacitance may be increased by increasing electrode surface areas and decreasing a distance between electrodes, and a method of manufacturing the same.

2. Description of the Related Art

In accordance with the recent trend for the miniaturization of electronic products, the demand for multilayer ceramic electronic components having a small size and large capacity has increased. Therefore, an attempt at thinning and multi-layering dielectric layers and internal electrodes have been undertaken through various methods. Recently, as the thickness of the dielectric layer has been thinned, multilayer ceramic electronic components having an increased number of stacked dielectric layers have been manufactured.

However, there is a need to efficiently design a structure between a ceramic and an internal electrode layer through new technology in order to manufacture a multilayer ceramic electronic component having larger capacitance.

In accordance with this demand, efforts for reducing an interval between electrodes while simultaneously increasing a surface area of the electrodes have been conducted to now.

SUMMARY OF THE INVENTION

An aspect of the present invention provides a multilayer thin film for a ceramic electronic component in which capacitance may be increased by increasing electrode surface areas and decreasing a distance between electrodes, and a method of manufacturing the same.

According to an aspect of the present invention, there is provided a multilayer thin film for a ceramic electronic component, the multilayered thin film including: a substrate; and a ceramic layer and a metal layer alternately formed on at least one of upper and lower surfaces of the substrate, wherein at least one of the ceramic layer and the metal layer has a height corresponding to a thickness of at least one of a plurality of particles arranged on a plane.

The ceramic layer and the metal layer may be charged with charges having opposing polarities.

The ceramic layer may be formed on at least one of the upper and lower surfaces of the substrate and the substrate is charged with a charge having a polarity opposite to that of a charge of the ceramic layer.

The metal layer may be formed on at least one of the upper and lower surfaces of the substrate and the substrate is charged with a charge having a polarity opposite to that of a charge of the metal layer.

The ceramic layers may have a thickness of 400 nm or less, and the metal layers may have a thickness of 500 nm or less.

The ceramic layer may be made of at least one selected from a group consisting of magnesium (Mg), calcium (Ca), strontium (Sr), barium (Ba), lanthanum (La), titanium (Ti), and zirconium (Zr).

The metal layer may be made of at least one selected from a group consisting of silver (Ag), lead (Pb), platinum (Pt), nickel (Ni), and copper (Cu).

According to another aspect of the present invention, there is provided a method of manufacturing a multilayer thin film for a ceramic electronic component, the method including: preparing a substrate; and alternately forming a ceramic layer and a metal layer on at least one of upper and lower surfaces of the substrate, wherein at least one of the ceramic layer and the metal layer has a height corresponding to a thickness of at least one of a plurality of particles arranged on a plane.

The alternately forming the ceramic layer and the metal layer on at least one of the upper and lower surfaces of the substrate may include: preparing a first solution containing metal oxide nano particles charged with a charge; preparing a second solution containing metal nano particles charged with a charge having a polarity opposite to that of the charge of the metal oxide nano particles; and alternately forming at least one ceramic layer and one metal layer on at least one of the upper and lower surfaces of the substrate by repeating an operation of alternately immersing the substrate charged with a charge in the first and second solutions.

The substrate may be charged with a charge having a polarity opposite to that of a charge of particles adjacent thereto.

The preparing of the first solution may be performed by dispersing the metal oxide nano particles into a solution having ceramic precursors dissolved therein.

A metal oxide in the first solution may include at least one selected from a group consisting of magnesium (Mg), calcium (Ca), strontium (Sr), barium (Ba), lanthanum (La), titanium (Ti), and zirconium (Zr).

A metal in the second solution may include at least one selected from a group consisting of silver (Ag), lead (Pb), platinum (Pt), nickel (Ni), and copper (Cu).

The repeating of the operation of alternately immersing the substrate in the first and second solutions includes cleaning the substrate with deionized distilled water and drying the substrate, after immerging the substrate in one of the first and second solutions, and before immerging the substrate in the other solution.

The ceramic layer may have a thickness of 400 nm or less, and the metal layer may have a thickness of 500 nm or less.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
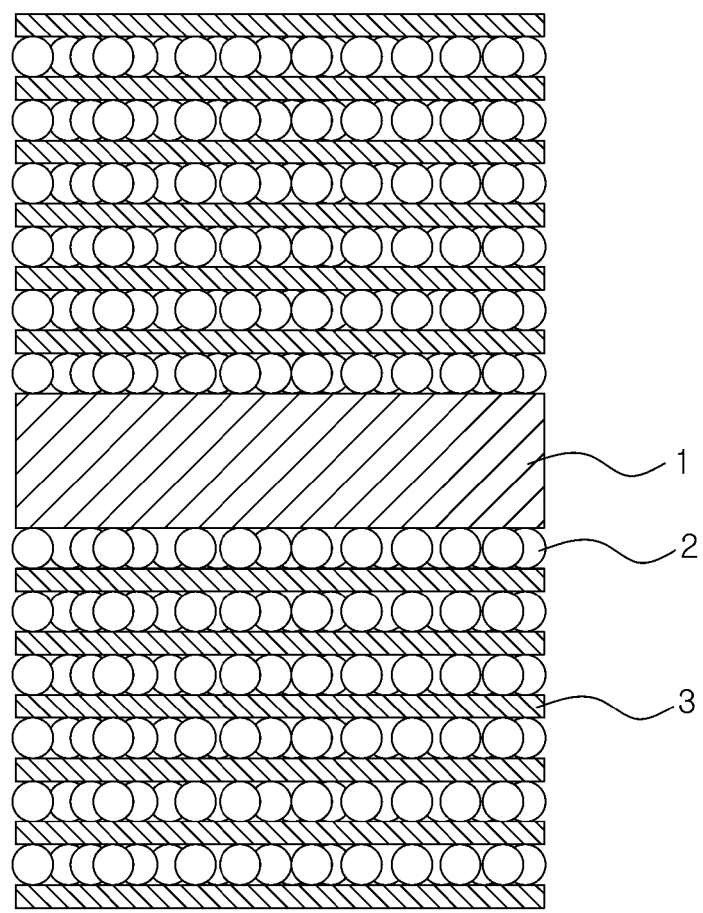
FIG. 1 is a cross-sectional view schematically showing a multilayer thin film for a ceramic electronic component according to an embodiment of the present invention.

Embodiments of the present invention may be modified in many different forms and the scope of the invention should not be construed as being limited to the embodiments set forth herein. Rather, these embodiments are provided so that this disclosure will be thorough and complete, and will fully convey the concept of the invention to those skilled in the art. In the drawings, the shapes and dimensions of elements may be exaggerated for clarity, and the same reference numerals will be used throughout to designate the same or like components.

Embodiments of the present invention will now be described in detail with reference to the accompanying drawings.

FIG. 1 is a cross-sectional view schematically showing a multilayer thin film for a ceramic electronic component according to an embodiment of the present invention.

Figure 2:
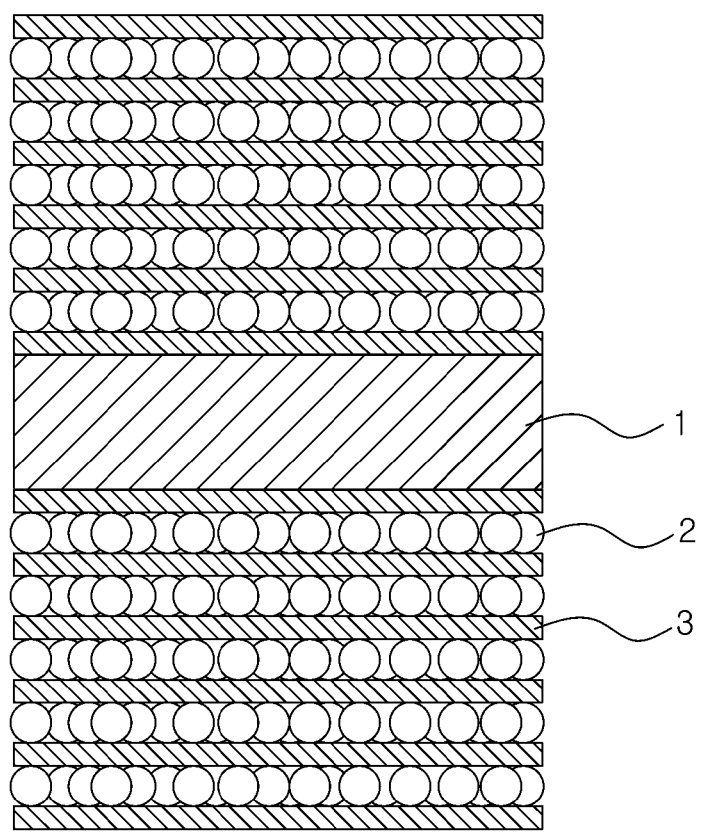
FIG. 2 is a cross-sectional view schematically showing a multilayer thin film for a ceramic electronic component according to another embodiment of the present invention.

FIG. 2 is a cross-sectional view schematically showing a multilayer thin film for a ceramic electronic component according to another embodiment of the present invention.

Referring to FIGS. 1 and 2, a multilayer thin film 10 for a ceramic electronic component according to an embodiment of the present invention may include a substrate 1; and ceramic layers 2 and metal layers 3 alternately formed on at least one of upper and lower surfaces of the substrate 1. Here, at least one of the ceramic layers 2 and the metal layers 3 may have a height corresponding to a thickness of at least one of a plurality of particles arranged on a plane.

The substrate 1 may be charged with a positive or negative charge and be charged with a charge having a polarity opposite to that of a charge of a layer adjacent thereto.

The layer adjacent to the substrate 1 may become the ceramic layer 2 or the metal layer 3 according to an object of the present invention.

Therefore, when a layer formed on at least one of the upper and lower surfaces of the substrate 1 is the ceramic layer 2, the substrate 1 may be charged with a charge having a polarity opposite to that of the charge of the ceramic layer 2, and when a layer formed on at least one of the upper and lower surfaces of the substrate 1 is the metal layer 2, the substrate 1 may be charged with a charge having a polarity opposite to that of the charge of the metal layer 3.

In addition, the ceramic layer 2 and the metal layer 3 may be charged with charges having opposing polarities.

FIG. 1 shows a case in which layers formed on the upper and lower surfaces of the substrate 1 are the ceramic layers 2, and FIG. 2 shows a case in which layers formed on the upper and lower surfaces of the substrate 1 are the metal layers 3.

As a result, the multilayer thin film 10 for a ceramic electronic component according to an embodiment of the present invention may have the ceramic layers 2 and the metal layers 3 alternately formed on at least one of the upper and lower surfaces of the charged substrate 1. Here, the ceramic layers 2 and the metal layers 3 are charged with charges having opposing polarities and one of the ceramic layers 2 and the metal layers 3 has a height corresponding to a thickness of at least one of a plurality of particles arranged on a plane.

According to an embodiment of the present invention, since one of the ceramic layers 2 and the metal layers 3 has the height corresponding to the thickness of at least one of the plurality of particles arranged on the plane, the ceramic layers 2 may have a thickness of 400 nm or less and the metal layers 3 may have a thickness of 500 nm or less.

That is, sizes of ceramic particles and metal particles may be controlled to control the thicknesses of the ceramic layers 2 and the metal layers 3, whereby a multilayer thin film structure in which the ceramic layers 3 and the metal layers 2 are repeated may be formed.

In addition, according to an embodiment of the present invention, the thicknesses of each layer may be accurately controlled, whereby a multilayer thin film for a ceramic electronic component having high reliability may be provided.

Meanwhile, the substrate 1 may be charged with a charge and be made of any material as long as the ceramic layer or the metal layer charged with a charge having a polarity opposite to that of a charge of the substrate 1 may be formed on the upper or lower surface of the substrate 1, for example, a conductive polymer.

As a method for allowing the substrate 1 to be charged with a charge, a general method may be used. Particularly, the substrate 1 may be charged with a charge by performing a plasma treatment thereon.

A material of the ceramic layer 2 is not specially limited but may include at least one selected from a group consisting of, for example, magnesium (Mg), calcium (Ca), strontium (Sr), barium (Ba), lanthanum (La), titanium (Ti), and zirconium (Zr).

In addition, the ceramic layer 2 may have an additive added thereto, in addition to the above-mentioned material.

The additive is not specially limited but may be, for example, zirconium acetate ($ZrAc_4$), zirconium chloride ($ZrCl_4$), calcium acetate ($Ca(C_2H_3O_2)_2$), or the like.

The ceramic layer 2 having the additive added thereto may be formed on at least one of the upper and lower surfaces of the substrate 1.

The additive may become a ceramic dielectric when the ceramic layer 2 is calcined at a high temperature.

In addition, the additive may be added to metal oxide nano particles to thereby fill in fine empty space of the ceramic layer.

Therefore, a packing density (PD) of the ceramic layer 2 may increase.

In addition, $BaCaTiZrO_3$(BCTZ) powder formed by the additive added to the ceramic layer may have higher permittivity than that of barium titanate ($BaTiO_3$) powder.

While the barium titanate ($BaTiO_3$) powder has permittivity of 2000 to 3500, the $BaCaTiZrO_3$(BCTZ) powder may have high permittivity of 5000 to 20000.

In addition, when the multilayer thin film 10 for a ceramic electronic component including the ceramic layer 2 having the additive added thereto is used in the electronic components, electronic components having excellent reliability may be implemented.

Further, a material of the metal layer 3 is not specially limited and may include at least one selected from a group consisting of, for example, silver (Ag), lead (Pb), platinum (Pt), nickel (Ni), and copper (Cu).

The multilayer thin film 10 for a ceramic electronic component according to an embodiment of the present invention may have a structure in which the ceramic layers 2 and the metal layers 3 are alternately formed on at least one of the upper and lower surfaces of the substrate 1, one of the ceramic layer 2 and the metal layer 3 having a height corresponding to a thickness of at least one of a plurality of particles arranged on a plane, as shown in FIG. 1.

According to an embodiment of the present invention, at least one of the ceramic layer 2 and the metal layer 3 has the height corresponding to the thickness of at least one of the plurality of particles arranged on the plane. Accordingly, the more the number of layers increases and an interval between the metal layers decreases, the more capacitance may increase.

Capacitance may be obtained from the following Equation;

$$C = \varepsilon_0 \varepsilon_r \frac{A}{d}$$ [Equation]

where C indicates capacitance, $\in$ indicates permittivity, A indicates a surface area of a metal, and d indicates an interval between metal layers.

That is, it may be appreciated from the above Equation that the more surface area A of the metal is increased and the interval d between the metal layers is reduced, the more capacitance increases.

Therefore, when the multilayer thin film 10 is used in the ceramic electronic components, the number of the ceramic layers 2/metal layers 3 capable of being stacked significantly increases and the distance between the metal layers 3 decreases, as compared to the case according to the related art, whereby the ceramic electronic components having high capacitance may be implemented.

The ceramic electronic component is not specially limited but may be, for example, a multilayer ceramic capacitor (MLCC), an inductor, a piezoelectric element, a varistor, thermistor, or the like.

According to an embodiment of the present invention, when the ceramic electronic component is the multilayer ceramic capacitor, the ceramic layer 2 may be a dielectric layer, the metal layer 3 may be an internal electrode layer, and charges may be stored in an internal electrode due to the dielectric layer formed between the internal electrode layers.

Therefore, the multilayer thin film according to an embodiment of the present invention is used in the multilayer ceramic capacitor, the number of layers increases and the distance between the internal electrodes decreases, whereby the multilayer ceramic capacitor having high capacitance may be implemented.

Figure 3:
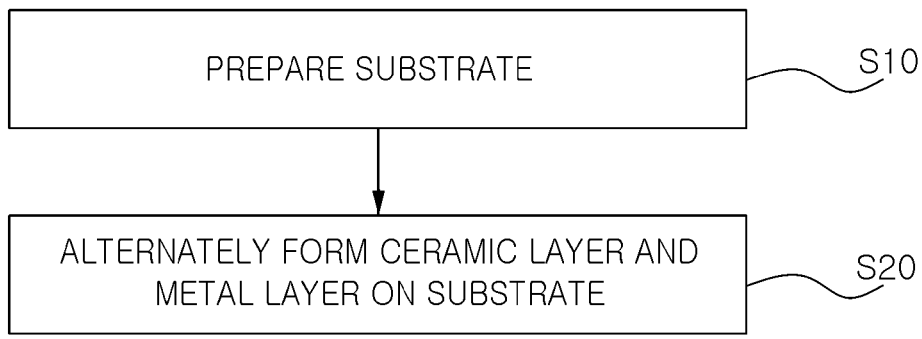
FIG. 3 is a flowchart showing a process for manufacturing a multilayer thin film for a ceramic electronic component according to an embodiment of the present invention.

FIG. 3 is a flow chart showing a process for manufacturing a multilayer thin film for a ceramic electronic component according to an embodiment of the present invention.

Figure 4:
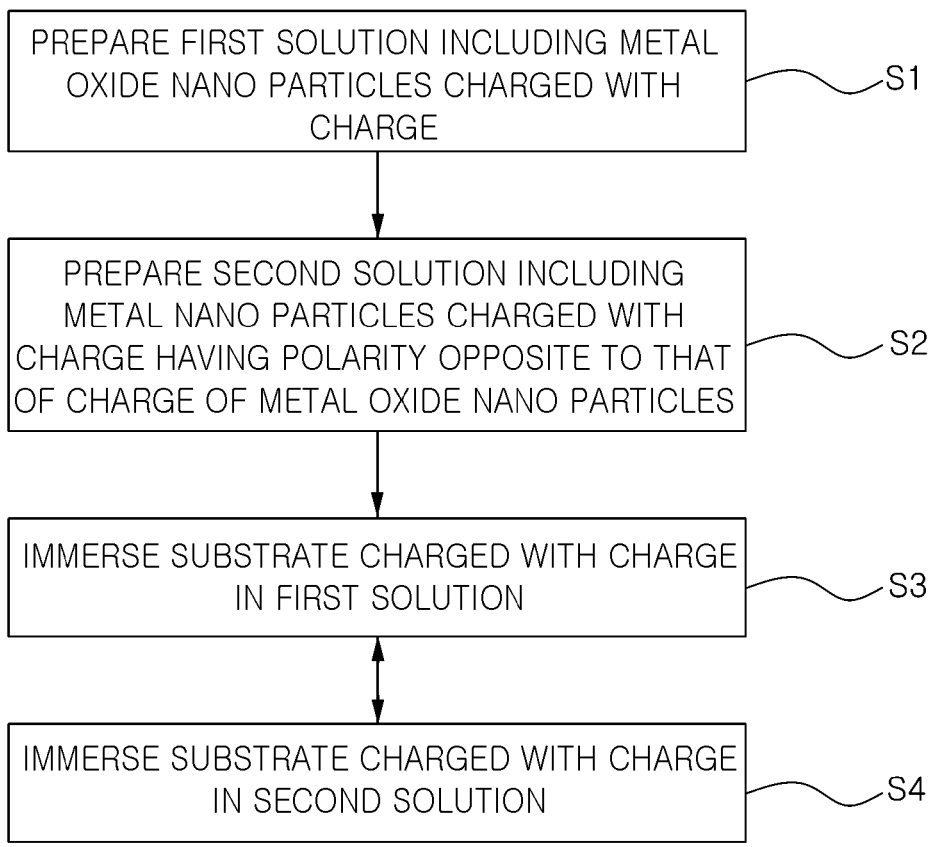
FIG. 4 is a flowchart showing a process for manufacturing a multilayer thin film for a ceramic electronic component according to an embodiment of the present invention.

FIG. 4 is a flow chart showing a process for manufacturing a multilayer thin film for a ceramic electronic component according to an embodiment of the present invention.

Figure 5:
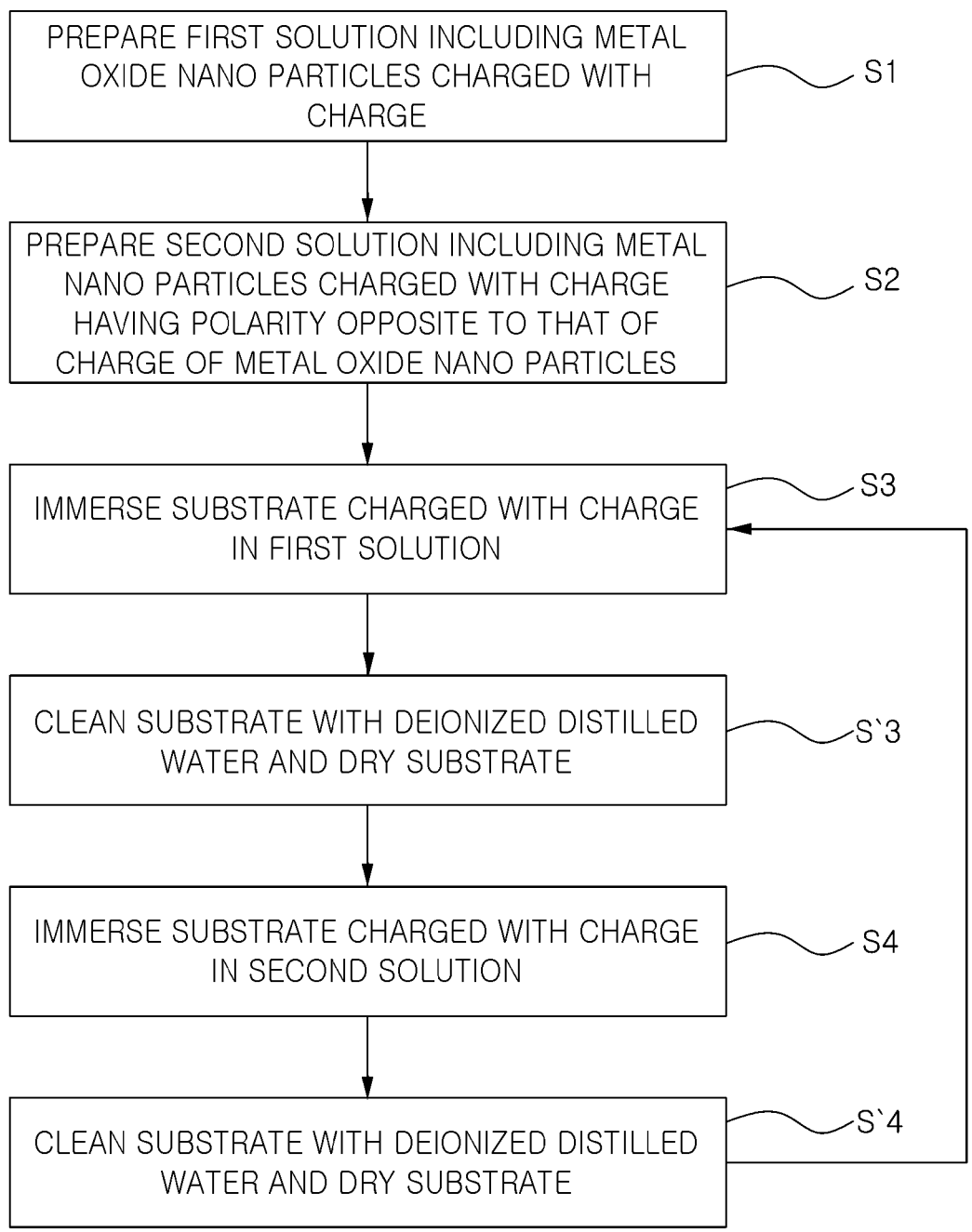
FIG. 5 is a flowchart showing a process for manufacturing a multilayer thin film for a ceramic electronic component according to another embodiment of the present invention.

FIG. 5 is a flow chart showing a process for manufacturing a multilayer thin film for a ceramic electronic component according to another embodiment of the present invention.

Referring to FIG. 3, a method of manufacturing a multilayer thin film for a ceramic electronic component according to an embodiment of the present invention includes: preparing a substrate (S10); and alternately forming ceramic layers and metal layers on at least one of upper and lower surfaces of the substrate (S20), one of the ceramic layers and the metal layers having a height corresponding to a thickness of at least one of a plurality of particles arranged on a plane.

Referring to FIG. 4, in the method of manufacturing a multilayer thin film for a ceramic electronic component according to an embodiment of the present invention, the alternately forming ceramic layers and metal layers on at least one of the upper and lower surfaces of the substrate may include: preparing a first solution containing metal oxide nano particles charged with a charge (S1); preparing a second solution containing metal nano particles charged with a charge having a polarity opposite to that of the charge of the metal oxide nano particles (S2); and alternately forming at least one ceramic layer and one metal layer on at least one of the upper and lower surfaces of the substrate by repeating an operation of alternately immersing the substrate charged with the charge in the first and second solutions (S3).

Hereinafter, the method of manufacturing a multilayer thin film for a ceramic electronic component according to an embodiment of the present invention will be described; however, a description of portions overlapped with the above-mentioned feature of the multilayer thin film for a ceramic electronic component will be omitted.

In the method of manufacturing a multilayer thin film 10 for a ceramic electronic component according to an embodiment of the present invention, the first solution containing the metal oxide nano particles charged with the charge may be first prepared (S1).

A metal oxide contained in the first solution is not specifically limited and may include at least one selected from a group consisting of, for example, magnesium (Mg), calcium (Ca), strontium (Sr), barium (Ba), lanthanum (La), titanium (Ti), and zirconium (Zr).

Due to the metal oxide nano particles contained in the first solution, the ceramic layer may be formed on the substrate through the next process of immersing the substrate in the first solution.

The preparing of the first solution may be performed by dispersing the metal oxide nano particles into a solution having ceramic precursors dissolved therein.

The additive is not specially limited and may be, for example, zirconium acetate ($ZrAc_4$), zirconium chloride ($ZrCl_4$), calcium acetate ($Ca(C_2H_3O_2)_2$), or the like.

The ceramic layer 2 may be formed on the substrate through a process of immersing the substrate in the solution containing the ceramic precursors and the metal oxide nano particles.

The ceramic precursor may become a ceramic dielectric when the ceramic layer 2 is calcined at a high temperature.

In addition, the ceramic precursors may be added to metal oxide nano particles to thereby fill a fine empty space of the ceramic layer.

Therefore, a packing density (PD) of the ceramic layer 2 may increase.

In addition, $BaCaTiZrO_3$(BCTZ) powders formed by the additive added to the ceramic layer may have higher permittivity than that of barium titanate ($BaTiO_3$) powders.

Zirconium acetate ($ZrAc_4$) or zirconium chloride ($ZrCl_4$) among the ceramic precursors is subjected to an annealing process at a high temperature to thereby form zirconia ($ZrO_2$).

The zirconia is used as an additive of the dielectric layer and the additive is added to the ceramic layer in order to improve reliability of an electronic component.

Therefore, when the multilayer thin film 10 for a ceramic electronic component including the ceramic layer 2 having the zirconia added thereto is used in the electronic components, the electronic components having excellent reliability may be implemented.

Then, the second solution including the metal nano particles charged with the charge having a polarity opposite to that of the charge of the metal oxide nano particles may be prepared (S2).

A metal contained in the second solution is not specially limited but may include at least one selected from a group consisting of, for example, silver (Ag), lead (Pb), platinum (Pt), nickel (Ni), and copper (Cu).

Due to the metal nano particles contained in the second solution, the metal layer may be formed on the substrate through the next process of immersing the substrate in the second solution.

Next, at least one ceramic layer and one metal layer may be alternately formed on at least one of the upper and lower surfaces of the substrate by repeating an operation of alternately immersing the substrate charged with the charge in the first and second solutions (S3 and S4).

The substrate may be charged with a charge having a polarity opposite to that of the charges of the particles adjacent thereto in the above-mentioned process.

As described above, the metal oxide nano particles and the metal nano particles that are charged with the charges having polarities opposite to each other may have an attractive force generated due to electrostatic force therebetween, whereby a thin film having a repetitive multilayer structure may be formed.

In addition, the metal layer may be first formed on at least one of the upper and lower surfaces of the substrate and the ceramic layer may be then formed on an upper portion of the metal layer, by allowing the first solution to contain the metal nano particles and the second solution to contain the metal oxide nano particles.

As described above, the operation of alternately immersing the substrate charged with the charge in the first and second solutions is repeated, whereby at least one ceramic layer and one metal layer may be alternately formed simply on the substrate without an expensive device.

In addition, the ceramic layers and the metal layers, of which one has a height corresponding to a thickness of at least one of a plurality of particles arranged on a plane, may be formed on at least one of the upper and lower surfaces of the substrate through the above-mentioned process, whereby the multilayer thin film for a ceramic electronic component may be manufactured.

According to an embodiment of the present invention, one of the ceramic layers and the metal layers has the height corresponding to the thickness of at least one of the plurality of particles arranged on the plane, such that diameters of ceramic particles and metal particles may become thicknesses of the ceramic layers and the metal layers and the thicknesses of each of the ceramic layers and the metal layers may significantly decrease unlike the case according to the related art.

Therefore, the number of the metal layers may increase and the distance between the metal layers may significantly decrease due to a thin thickness of the ceramic layer, as compared to the case according to the related art.

Accordingly, the ceramic electronic components to which the multilayer thin film for a ceramic electronic component according to the present embodiment is applied may have increased capacitance, whereby the electronic component having high capacitance may be manufactured.

In addition, the diameters of the metal oxide nano particles and the metal nano particles are controlled to control the thicknesses of each of the ceramic layers and the metal layers, whereby the ceramic electronic component having excellent reliability may be manufactured.

Meanwhile, the method of manufacturing a multilayer thin film for a ceramic electronic component according to another embodiment of the present invention may further include cleaning the substrate with deionized distilled water and drying the substrate after immerging the substrate in one solution and before immerging the substrate in another solution in repeating the operation of alternately immersing the substrate in the first and second solutions (S'3 and S'4).

FIG. 5 shows a process for manufacturing a multilayer thin film for a ceramic electronic component according to another embodiment of the present invention.

Referring to FIG. 5, a process of immersing the substrate charged with the charge in the first solution, cleaning the substrate with the deionized distilled water and then drying the substrate (S'3) and a process of immersing the substrate in the second solution, cleaning the substrate with the deionized distilled water and then drying the substrate (S'4) may be repeatedly performed.

Therefore, materials more than required materials may be prevented from being added to each layer, whereby a uniform film having high purity may be formed and a multilayer thin film having a uniform thickness may be manufactured.

According to the embodiment of the present invention, the ceramic layer and the metal layer having a nanometer thickness may be prepared through the above-mentioned process and the thickness of the ceramic layer and the metal layer may be easily controlled, whereby the number of layers may be significantly increased, as compared to the ceramic electronic component according to the related art having the same size.

Therefore, the distance between the electrodes may significantly decrease, such that capacitance may increase, whereby the ceramic electronic component having high capacitance may be manufactured.

As set forth above, with the multilayer thin film for a ceramic electronic component according to the embodiments of the present invention, the ceramic layers and the metal layers are alternately formed while at least one of the ceramic layers and the metal layers has a height corresponding to a thickness of the plurality of particles arranged on the plane, such that the number of layers increases and the interval between the electrodes decreases, whereby when the multilayer thin film is used in the ceramic electronic components, capacitance may increase.

In addition, the thicknesses of each layer may be accurately controlled, whereby the multilayer thin film for a ceramic electronic component having high reliability may be provided.

With the method of manufacturing the multilayer thin film for a ceramic electronic component according to the embodiments of the present invention, the multilayer thin film may be formed only through a process of alternately immersing the substrate charged with the charge in the solutions charged with the charges having opposing polarities, such that an expensive device is not required. Therefore, the method of manufacturing the multilayer thin film for a ceramic electronic component according to the embodiments of the present invention may have excellent economic efficiency.

While the present invention has been shown and described in connection with the embodiments, it will be apparent to those skilled in the art that modifications and variations can be made without departing from the spirit and scope of the invention as defined by the appended claims.

What is claimed is:

1. A multilayer thin film for a multilayer ceramic capacitor, the multilayer thin film comprising:
   a substrate having opposing upper and lower surfaces; and
   a plurality of ceramic layers and a plurality of metal layers alternately formed on both the upper and lower surfaces of the substrate,
   wherein at least one of the ceramic layers and the metal layers has a height corresponding to a thickness of at least one of a plurality of particles arranged on a plane, and
   the ceramic layers and the metal layers are charged with charges having opposing polarities, and wherein the ceramic layers are made of at least one selected from the group consisting of magnesium (Mg), calcium (Ca), strontium (Sr), barium (Ba), lanthanum (La), titanium (Ti), and zirconium (Zr), and the ceramic layers include an additive selected from the group consisting of zirconium acetate ($ZrAc_4$), zirconium chloride ($ZrCl_4$), calcium acetate (($CaC_2H_3O_2)_2$) and $BaCaTiZrO_3$ (BCTZ).

2. The multilayer thin film of claim 1, wherein the ceramic layers are formed on the upper and lower surfaces of the substrate and the substrate is charged with a charge having a polarity opposite to that of a charge of the ceramic layers.

3. The multilayer thin film of claim 1, wherein the metal layers are formed on the upper and lower surfaces of the substrate and the substrate is charged with a charge having a polarity opposite to that of a charge of the metal layers.

4. The multilayer thin film of claim 1, wherein the ceramic layers have a thickness of 400 nm or less.

5. The multilayer thin film of claim 1, wherein the metal layers have a thickness of 500 nm or less.

6. The multilayer thin film of claim 1, wherein the metal layers are made of at least one selected from a group consisting of silver (Ag), lead (Pb), platinum (Pt), nickel (Ni), and copper (Cu).

\* \* \* \* \*